(12) United States Patent
Yabuguchi et al.

(10) Patent No.: US 8,907,610 B2
(45) Date of Patent: Dec. 9, 2014

(54) MOTOR CONTROL DEVICE

(75) Inventors: Michisada Yabuguchi, Kasugai (JP); Tetsuya Fukumoto, Nagoya (JP); Takenobu Nakamura, Kani (JP)

(73) Assignee: Omron Automotive Electronics Co., Ltd., Aichi (JP)

(*) Notice: Subject to any disclaimer, the term of this patent is extended or adjusted under 35 U.S.C. 154(b) by 185 days.

(21) Appl. No.: 13/543,281

(22) Filed: Jul. 6, 2012

(65) Prior Publication Data

US 2013/0009587 A1    Jan. 10, 2013

(30) Foreign Application Priority Data

Jul. 6, 2011   (JP) .................................. 2011-150209

(51) Int. Cl.
*G05B 19/408*    (2006.01)
*H02P 27/08*    (2006.01)

(52) U.S. Cl.
CPC ............ *H02P 27/08* (2013.01); *H02P 2205/01* (2013.01)
USPC .................. 318/568.22; 318/632; 318/400.3; 318/71; 318/400.12

(58) Field of Classification Search
CPC .... G05B 19/416; G05B 19/232; G05B 19/19; G05B 13/042; G05B 19/237; G05B 19/404; G05B 19/33; G05B 2219/41036; G05B 3/122; G11B 5/5547; B25J 9/1633; G01R 19/00; G01R 31/3606; G05F 1/10; H02M 3/158; H02M 7/53803; H02M 7/53871; B60L 2240/549; B60L 3/0061; B60L 2240/429; H02P 2006/045; H02P 21/0035

USPC ............ 318/561, 598.22, 632, 400.3, 568.22, 318/71, 400.22, 727, 811, 599, 798, 606, 318/560.563, 560.561, 432, 400.02, 400.29

See application file for complete search history.

(56) References Cited

U.S. PATENT DOCUMENTS 5,780,989 A * 7/1998 Matsumoto ................... 318/632
6,445,155 B1 * 9/2002 Williams et al. .............. 318/727

(Continued)

FOREIGN PATENT DOCUMENTS

JP    8047280 A    2/1996
JP    8175405 A    7/1996

(Continued)

OTHER PUBLICATIONS

English Patent Abstract of JP 8-175405, Publication Date: Jul. 9, 1996 (1 Page).

(Continued)

*Primary Examiner* — Kawing Chan
*Assistant Examiner* — Jorge L Carrasquillo
(74) *Attorney, Agent, or Firm* — Osha Liang LLP (57) ABSTRACT

A motor control device has a motor driving unit that drives a motor, a current detecting unit that detects a motor current flowing through the motor, a control unit that compares a detected current value of the motor current detected by the current detecting unit with a target current value to obtain a deviation, to control the motor driving unit based on the deviation, and a compensation unit that sets as a current offset value a detected current value of a drift current detected by the current detecting unit in a state where the motor current is regarded as zero, to compensate the detected current value of the motor current by the current offset value. The compensation unit sets a target offset value according to the current value of the detected drift current to correct the current offset value stepwise until the current offset value reaches the target offset value.

4 Claims, 10 Drawing Sheets

(56) References Cited

U.S. PATENT DOCUMENTS

| | | | |
|---|---|---|---|
| 7,560,897 B2* | 7/2009 | Watanabe | 318/811 |
| 8,648,560 B2* | 2/2014 | Matsushita et al. | 318/432 |
| 2011/0074329 A1* | 3/2011 | Matsushita et al. | 318/503 |

FOREIGN PATENT DOCUMENTS

| | | |
|---|---|---|
| JP | H09-121584 A | 5/1997 |
| JP | 2000-023490 A | 1/2000 |
| JP | 2001-095279 A | 4/2001 |
| JP | 2002-029432 A | 1/2002 |
| JP | 2002-029444 A | 1/2002 |
| JP | 2003-324985 A | 11/2003 |
| JP | 2011-061910 A | 3/2011 |

OTHER PUBLICATIONS

Office Action in counterpart Japanese Patent Application No. 2011-150209 issued Jul. 29, 2014 (7 pages).

* cited by examiner

MOTOR CONTROL DEVICE

TECHNICAL FIELD

The present invention relates to a motor control device for detecting a current flowing through a motor, to control the motor based on a deviation between a detected current value and a target current value, and particularly relates to a technique for compensating a drift current that is detected in a state where the motor current is regarded as zero.

BACKGROUND ART

In an electric power steering device of a vehicle, an electric motor such as a blushless motor is provided for providing a steering mechanism with steering auxiliary force in accordance with a steering torque of a wheel. As a device for driving this motor, there is known a motor control device using a PWM (Pulse Width Modulation) control system.

Generally, the motor control device using the PWM control system is provided with an inverter circuit and a control part for controlling this inverter circuit. The inverter circuit is provided with a plurality of pairs (three pairs in the case of a three-phase motor) of an upper arm and a lower arm each having a switching element. Further, the control part calculates a target value of a current to be allowed to flow through the motor in accordance with a steering torque detected by a torque sensor, to generate a PWM signal having a predetermined duty based on a deviation between this target value and a value of the current actually flowing through the motor. The control part then controls an ON/OFF operation of each switching element in the inverter circuit by means of this PWM signal, and accordingly supplies a current from a power source to the motor via the inverter circuit, to drive the motor.

In the motor control device as described above, the current flowing through the motor is detected by means of a resistor for current detection, called a shunt resistor. Incidentally, during a period when all the switching elements on the upper stages in the inverter circuit are off or during a period when all the switching elements on the lower stages in the inverter circuit are off, the inverter circuit is in a regenerating state, and the current theoretically does not flow through the shunt resistor. That is, the circuit is in a state where the motor current is regarded as zero. However, due to such an influence that part of circuit outputs in the inverter circuit is not zero, the current may practically flow through the shunt resistor even during the above period. This current is referred to as a drift current. Although being a minute current, the drift current has an influence on steering auxiliary force since the current flows during a period when the detected current value should essentially be zero, causing a driver to have a feeling of strangeness in terms of steering feeling.

Thereat, it is necessary to compensate an offset based on the drift current, so as to prevent the steering auxiliary force from being influenced by the drift current. To this end, a value of the drift current, detected in the state of the motor current being regarded as zero, is referred to as a current offset value, and a detected current value in the case of the current flowing through the motor is compensated by means of the current offset value. Based on the compensated current value and a target current value, a voltage command value for feedback control is calculated, to control the current flowing through the motor based on this voltage command value. The below-mentioned Unexamined Japanese Patent Publication No. H08-47280, Unexamined Japanese Patent Publication No. 08-175405 and Unexamined Japanese Patent Publication No. 2001-95279 describe techniques concerning offset compensation based on a drift current.

Unexamined Japanese Patent Publication No. H08-47280 describes a control method for an AC servo motor, which detects an actual current of a motor to obtain offset data every time a voltage command becomes zero, updates a current offset value by means of a current offset value obtained from the offset data, and feeds back the updated current offset value to the current command, thereby to perform offset compensation corresponding to a drift.

Unexamined Japanese Patent Publication No. H08-175405 describes an electric power steering device provided with an offset compensation unit for taking as an offset compensation value a value of a motor current detection signal in a state where a motor current is regarded as zero, to correct a deviation signal between a target current signal and a motor current detection signal based on the offset compensation value.

Unexamined Japanese Patent Publication No. 2001-95279 describes a motor controlling method for monitoring a current flowing through a motor by means of a shunt resistor, measuring an output of the shunt resistor on such timing that a moment current flowing through this resistor practically becomes zero, to generate a signal for compensating an offset between an actual measurement output value and an ideal output value.

When the motor current is compensated by means of the current offset value, upon an abrupt change in current offset value in accordance with the drift current, the voltage command value also abruptly changes in association with the above change. Accordingly, the number of revolutions of the motor abruptly changes, thus destabilizing the steering feeling,

SUMMARY

One or more embodiments of the present invention provides a motor control device capable of suppressing an abrupt change in current offset value, to hold stable steering feeling.

A motor control device according to one or more embodiments of the present invention includes: a motor driving unit for driving a motor; a current detecting unit for detecting a motor current flowing through the motor; a control unit for comparing a detected current value of the motor current, detected by the current detecting unit, with a target current value, to control the motor driving unit based on the deviation; and a compensation unit for setting as a current offset value a detected current value of a drift current detected by the current detecting unit in a state where the motor current is regarded as zero, to compensate the detected current value of the motor current by means of the current offset value. The compensation unit sets a target offset value in accordance with the current value of the detected drift current, to correct the current offset value stepwise until the current offset value reaches the target offset value.

In such a manner, even when the drift current changes in a large scale, the current offset value does not abruptly change, and is corrected so as to gradually get closer to the target offset value. Hence it is possible to avoid the abrupt change in number of revolutions of the motor in association with the abrupt change in voltage command value, so as to hold stable steering feeling.

According to one or more embodiments of the present invention, the current detecting unit detects the drift current with respect to each predetermined cycle, and the compensation unit sets a target offset value with respect to each cycle based on a detected current value of the drift current detected by the current detecting unit. In this case, the compensation unit adds a previously set correction value to the current offset value when the current offset value is smaller than the target offset value, and subtracts the correction value from the current offset value when the current offset value is larger than the target offset value, thereby to correct the current offset value with respect to each cycle.

According to one or more embodiments of the present invention, the current detecting unit detects a motor current with respect to each predetermined period, and the compensation unit compensates a detected current value of the motor current detected by the current detecting unit by means of the corrected current offset value with respect to each cycle. In this case, the control unit controls the motor diving unit based on a deviation between the compensated detected current value of the motor current and the target current value with respect to each cycle.

According to one or more embodiments of the present invention, the compensation unit obtains a difference between the current offset value and the detected current value of the drift current, and sets the target offset value, to correct the offset value only when this difference is not in a predetermined range.

According to one or more embodiments of the present invention, the compensation unit sets as an initial value of a current offset value the detected current value of the drift current detected by the current detecting unit during the time after turning-on of a power source of the motor driving unit until start of operation of the motor driving unit, and the control unit controls the motor driving unit based on a deviation between the detected current value of the motor current, compensated by means of the initial value, and the target current value after start of operation of the motor driving unit.

According to one or more embodiments of the present invention, it is possible to provide a motor control device capable of suppressing an abrupt change in current offset value, to hold stable steering feeling.

DETAILED DESCRIPTION

Hereinafter, embodiments of the present invention will be described with reference to the drawings. In each figure, the same portion or corresponding portion is provided with the same numeral. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
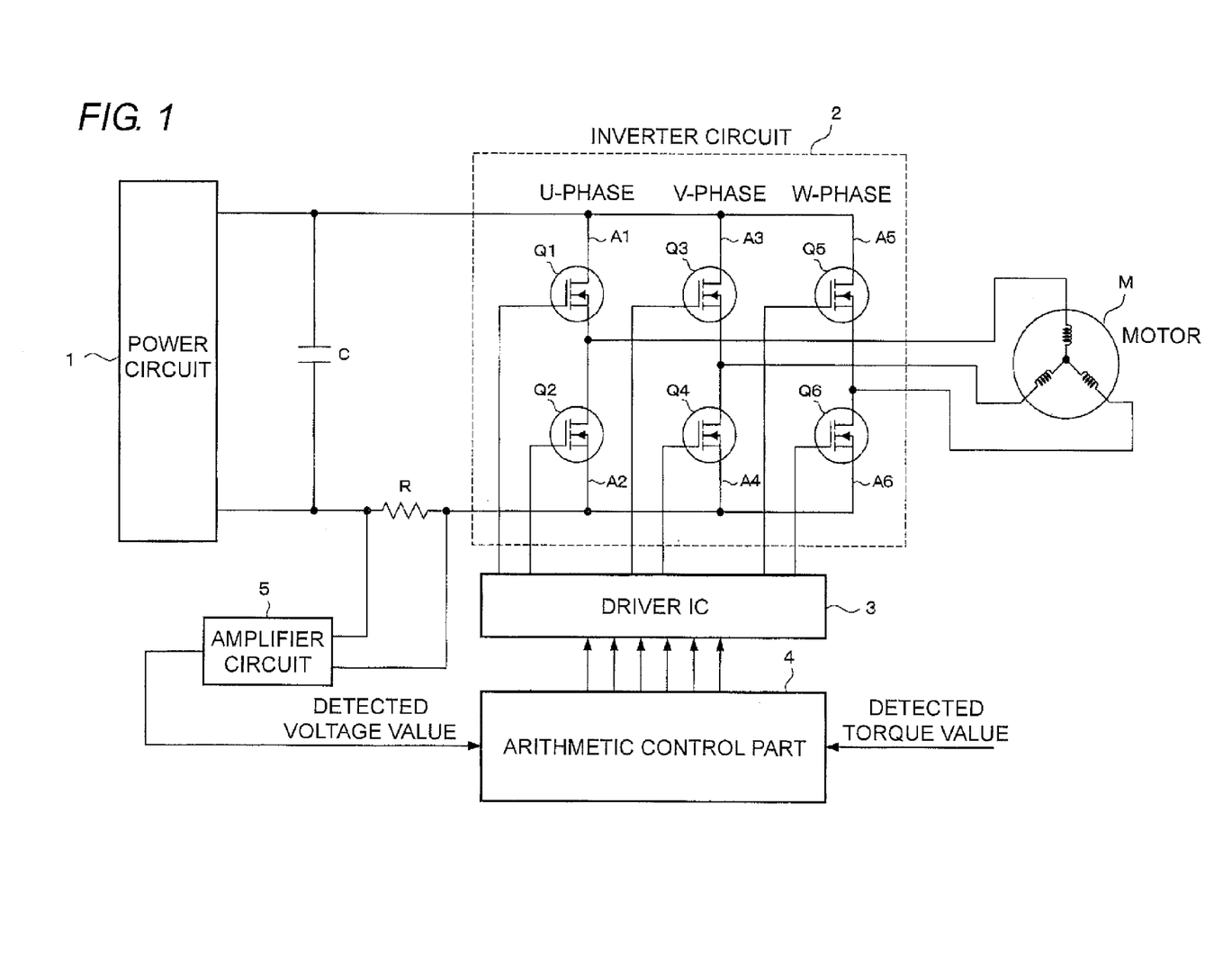
FIG. 1 is a diagram showing a motor control device according to one or more embodiments of the present invention.

FIG. 1 shows one example of a motor control device using a PWM control system. A power circuit 1 is configured of a rectifying circuit, a smoothing circuit or the like, and its output end is connected with a capacitor C. The inverter circuit 2 is configured of a three-phase bridge, provided with three pairs of upper and lower arms corresponding to a U-phase, a V-phase and a W-phase. An upper arm A1 of the U-phase has a switching element Q1, and a lower arm A2 of the U-phase has a switching element Q2. An upper arm A3 of the V-phase has a switching element Q3, and a lower arm A4 of the V-phase has a switching element Q4. An upper arm A5 of the W-phase has a switching element Q5, and a lower arm A6 of the W-phase has a switching element Q6. These switching elements Q1 to Q6 are each made up of an FET (Field Effect Transistor). The inverter circuit 2 constitutes the motor driving unit according to one or more embodiments of the present invention along with the below-mentioned driver IC3.

A motor M is, for example, a three-phase blushless motor used for an electric power steering device of a vehicle. A shunt resistor R for detecting a current (motor current) flowing through the motor M is made up of a single resistor, and connected to between the power circuit 1 and the inverter circuit 2, A voltage at each end of the shunt resistor R is provided to an amplifier circuit 5. The amplifier circuit 5 amplifies the voltage at each end of the shunt resistor R, and outputs the voltage to an arithmetic control part 4. The arithmetic control part 4 is made up of a CPU, a memory and the like. The shunt resistor R, the amplifier circuit 5 and the arithmetic control part 4 constitute the current detecting unit in one or more embodiments of the present invention. Further, the arithmetic control part 4 constitutes the control unit and the compensation unit in one or more embodiments of the present invention.

Into the arithmetic control part 4, an output of the amplifier circuit 5 is inputted as a detected voltage value, and a detected torque value is inputted from a torque sensor (not shown) for detecting a steering torque. The arithmetic control part 4 calculates a detected current value of the motor current from the detected voltage value, and also calculates a target current value (target value of a current to be allowed to flow through the motor M) from the detected torque value, to calculate a duty of a PWM signal of each phase based on a deviation between the detected current value and the target current value. Then, the PWM signal of each phase, generated based on this duty and a saw-tooth carrier signal, is supplied to the driver IC3. Further, the arithmetic control part 4 performs drift compensation on the detected current value of the motor current based on a drift current flowing through the shunt resistor R (detail will be described later).

The driver IC3 outputs the PWM signal of each phase for individually turning on/off each of the switching elements Q1 to Q6 to each gate of the switching elements Q1 to Q6. By on/off operation of each of the switching elements Q1 to Q6 based on this PWM signal, a current is supplied from the power circuit 1 to the motor M via the inverter circuit 2, and the motor M is rotated.

Figure 2:
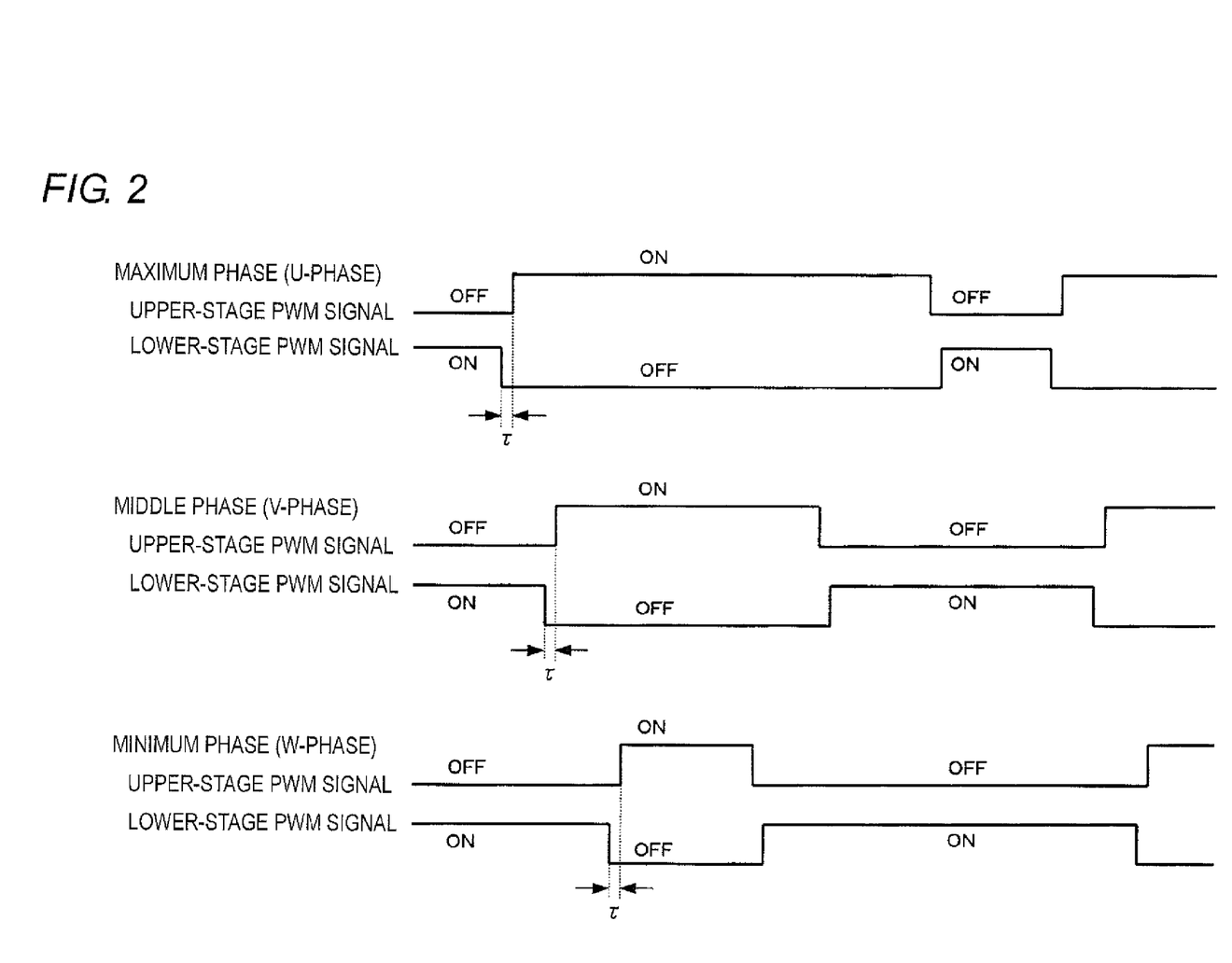
FIG. 2 is a diagram showing a PWM signal of each phase.

FIG. 2 shows the PWM signal that is provided from the driver IC3 to the inverter circuit 2. Herein, the U-phase is regarded as a maximum phase having a maximum duty, the V-phase as a middle phase having a middle duty, and the W-phase as a minimum phase having a minimum duty. An upper-stage PWM signal of the U-phase is a PWM signal to be applied to the switching element Q1 of the upper arm A1, and a lower-stage PWM signal thereof is a PWM signal to be applied to the switching element Q2 of the lower arm A2. An upper-stage PWM signal of the V-phase is a PWM signal to be applied to the switching element Q3 of the upper arm A3 and a lower-stage PWM signal thereof is a PWM signal to be applied to the switching element Q4 of the lower arm A4. An upper-stage PWM signal of the W-phase is a PWM signal to be applied to the switching element Q5 of the upper arm A5 and a lower-stage PWM signal thereof is a PWM signal to be applied to the switching element Q6 of the lower arm A6. It is to be noted that symbol T in the figure denotes dead time for avoiding occurrence of a short circuit in the inverter circuit 2 due to the upper and lower switching elements in the respective arms simultaneously coming into an on-state.

Figure 3:
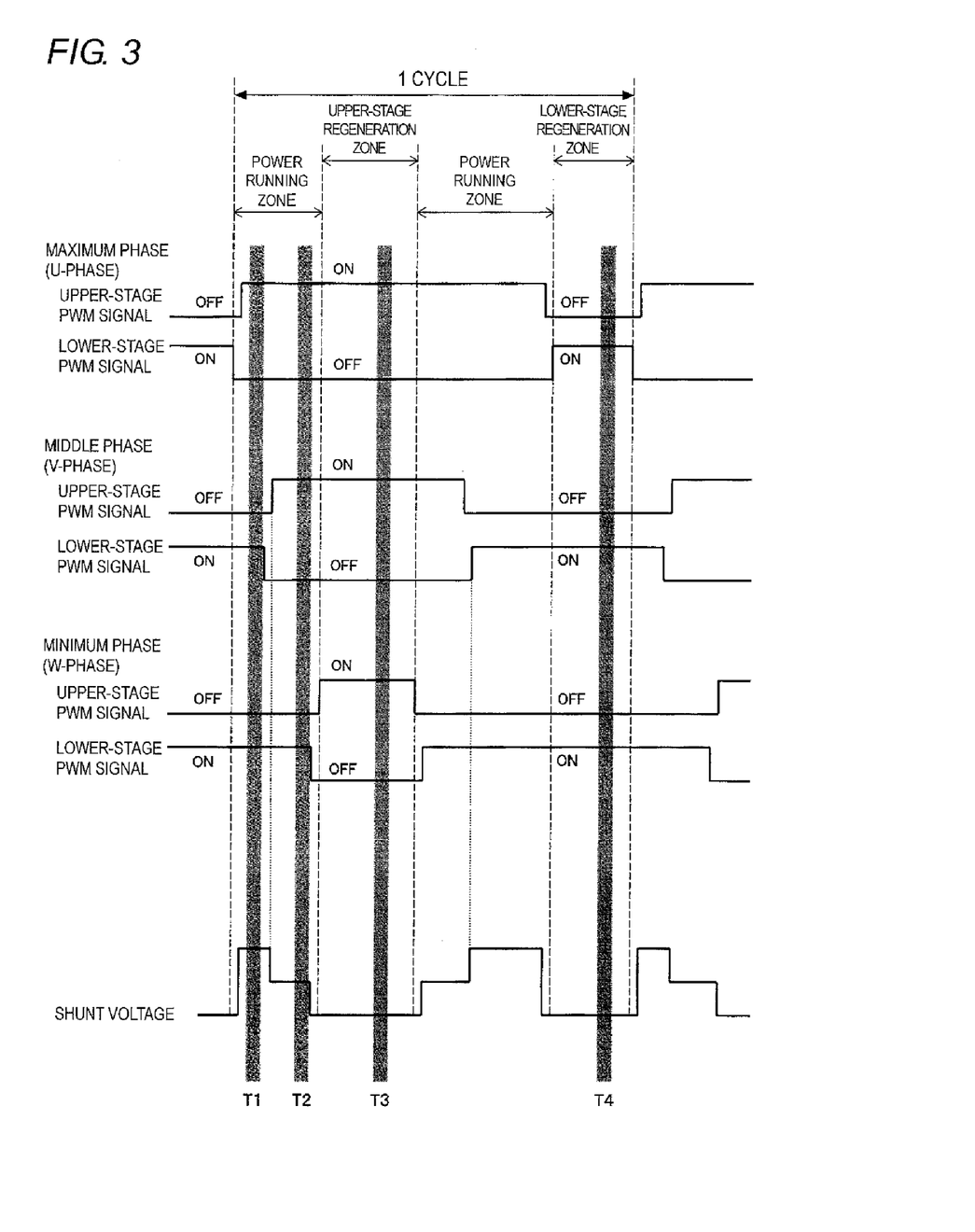
FIG. 3 is a diagram explaining timing for current detection.

Next, timing for detecting the current flowing through the motor M will be described with reference to FIG. 3. As shown in FIG. 3, in one cycle of the PWM signal, there exist a power running zone and a regeneration zone (upper-stage regeneration zone and a lower-stage regeneration zone). In the power running zone, except for the dead-time zone, at least one of the switching elements (hereinafter referred to as upper-stage switching elements) Q1, Q3, Q5 in the upper arm of the inverter circuit 2 comes into the on-state, and at least one of the switching elements (hereinafter referred to as lower-stage switching elements) Q2, Q4, Q6 in the lower arm thereof comes into the on-state, thereby to allow the motor current to flow through the shunt resistor R. For this reason, the shunt voltage shown in the figure appears at each end of the shunt resistor R.

On the other hand, in the upper-stage regeneration zone in which all the upper-stage switching elements Q1, Q3, Q5 are in the on-state and all the lower-stage switching elements Q2, Q4, Q6 are in the off-state, the shunt voltage does not appear at each end of the shunt resistor R since the motor current theoretically does not flow through the shunt resistor R. Further, also in the lower-stage regeneration zone in which all the upper-stage switching elements Q1, Q3, Q5 are in the off-state and all the lower-stage switching elements Q2, Q4, Q6 are in the on-state, the shunt voltage does not appear at each end of the shunt resistor R since the motor current theoretically does not flow through the shunt resistor R.

Symbols T1 to T4 denote timing for detecting the current flowing through the shunt resistor R. The timing here means a concept of a zone with a time width in which current detection is possible. The timing T1, T2 are detection timing in the power running zone, and these are normal current detection timing in the state of the motor current flowing through the shunt resistor R. The timing T3, T4 are detection timing respectively in the upper-stage regeneration zone and the lower-stage regeneration zone, and these are current detection timing in the state of the current theoretically not flowing through the shunt resistor R, namely the state of the motor current being regarded as zero.

Figure 4:
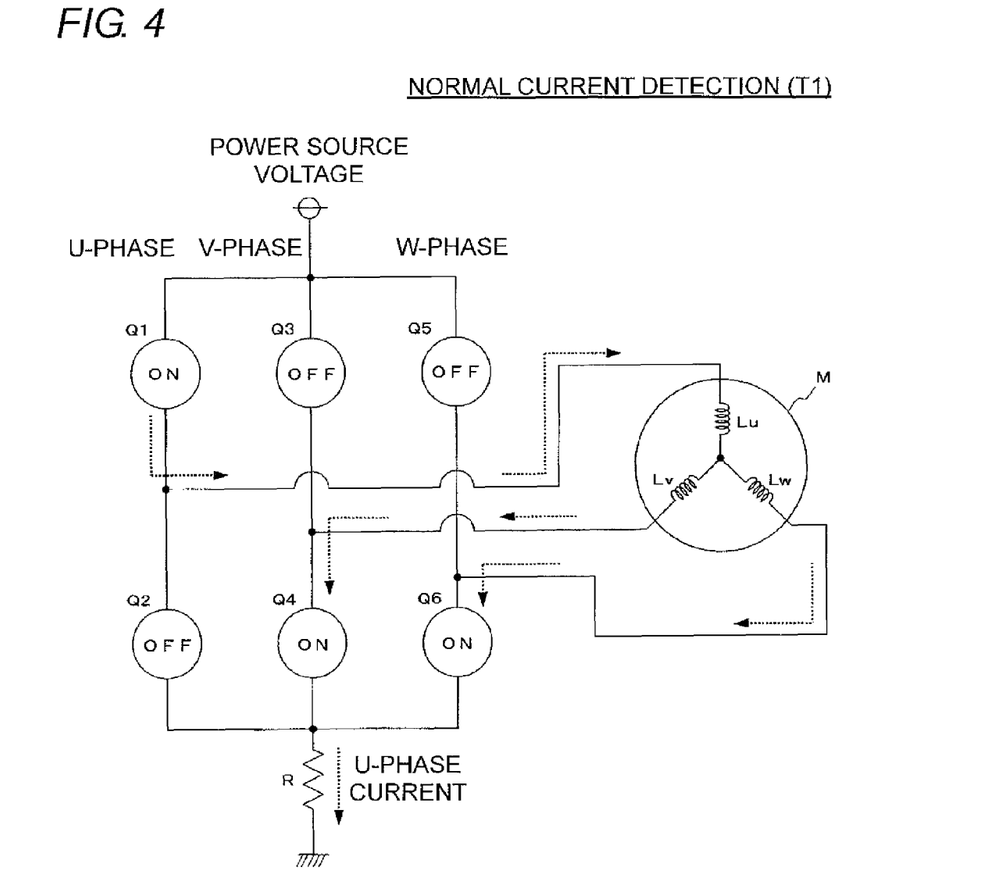
FIG. 4 is a diagram showing a current channel on timing T1 of FIG. 3.
Figure 5:
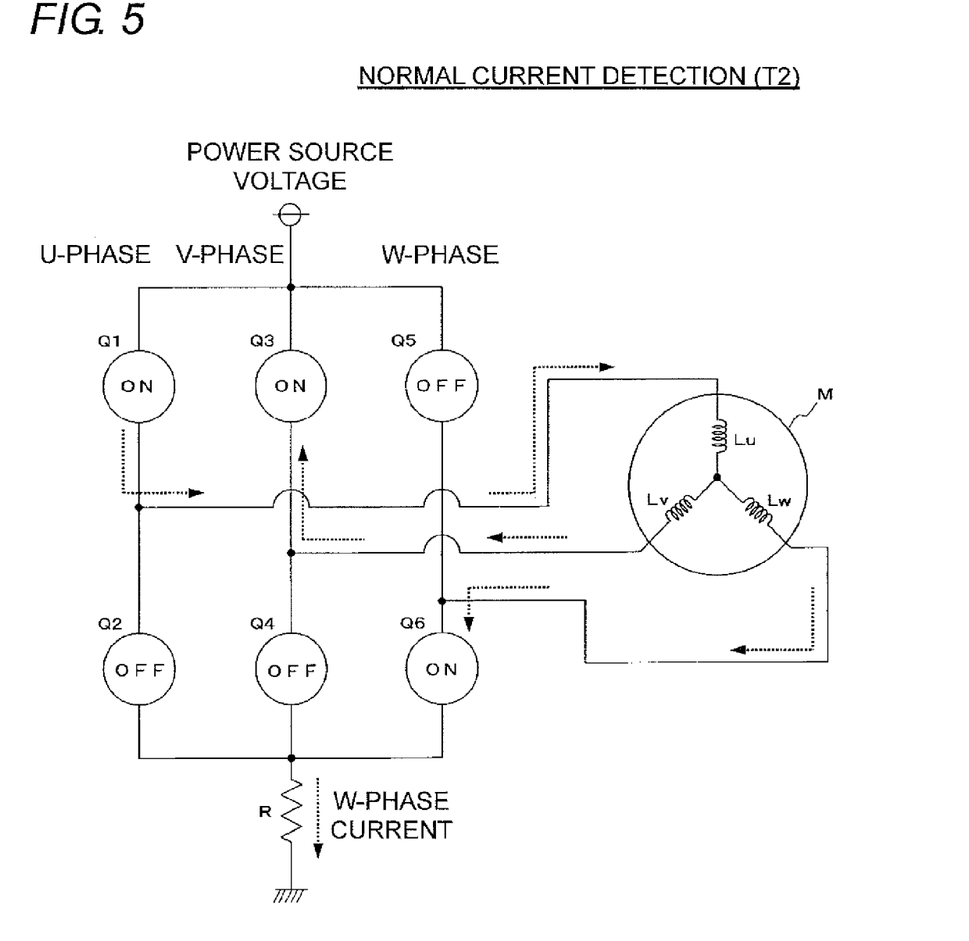
FIG. 5 is a diagram showing the current channel on timing T2 of FIG. 3.

On the timing T1 of FIG. 3, the upper-stage switching elements Q1, Q3, Q5 are respectively on, off, off and the lower-stage switching elements Q2, Q4, Q6 are respectively off, on, on, and in the inverter circuit 2, the current flows in channels indicated by dashed arrows in FIG. 4. At this time, the current flowing through the shunt resistor R is a U-phase current, and the U-phase current of the motor M is detected on the timing T1, On the timing T2 of FIG. 3, the upper-stage switching elements Q1, Q3, Q5 are respectively on, on, off and the lower-stage switching elements Q2, Q4, Q6 are respectively off, off, on, and in the inverter circuit 2, the current flows in channels indicated by dashed arrows in FIG. 5. At this time, the current flowing through the shut resistor R is a W-phase current, and the W-phase current of the motor M is detected on the timing T2.

A V-phase current can be obtained by calculation from the U-phase and the W-phase. That is, when a U-phase current value is taken as Iu, a V-phase current value as Iv and a W-phase current value as Iw, the following relation is established among these.

$Iu+Iv+Iw=0$

Therefore, the V-phase current value Iv can be calculated as:

$Iv=-(Iu+Iv)$

Figure 6:
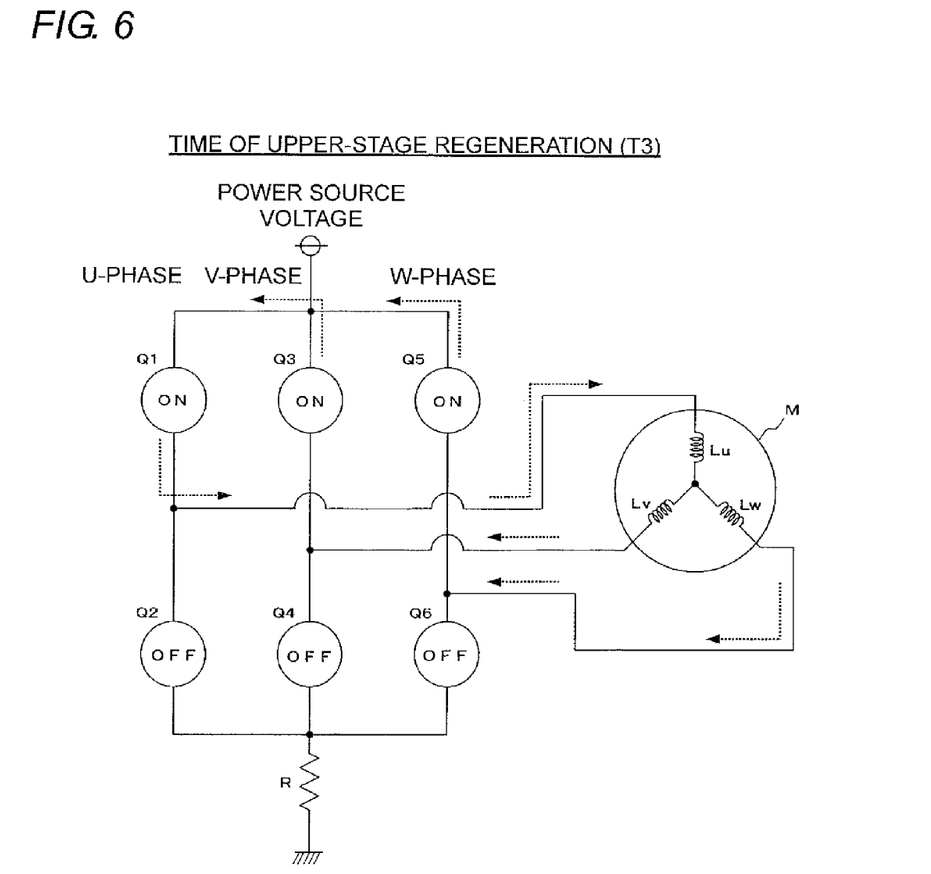
FIG. 6 is a diagram showing the current channel on timing T3 of FIG. 3.

On the timing T3 of FIG. 3, the upper-stage switching elements Q1, Q3, Q5 are all on and the lower-stage switching elements Q2, Q4, Q6 are all off, and in the inverter circuit 2, the current flows in channels indicated by dashed arrows in FIG. 6. The current at this time is a regeneration current due to release of electric energy stored in windings Lu, Lv, Lw of the motor M, and is circulated via the upper-stage switching elements Q1, Q3, Q5. Hence the current should theoretically not flow through the shunt resistor R on the timing T3. However, as described above, the drift current may practically flow through the shunt resistor R. In this case, with a voltage generated at each end of the shunt resistor R, a drift current is detected based on this voltage.

Figure 7:
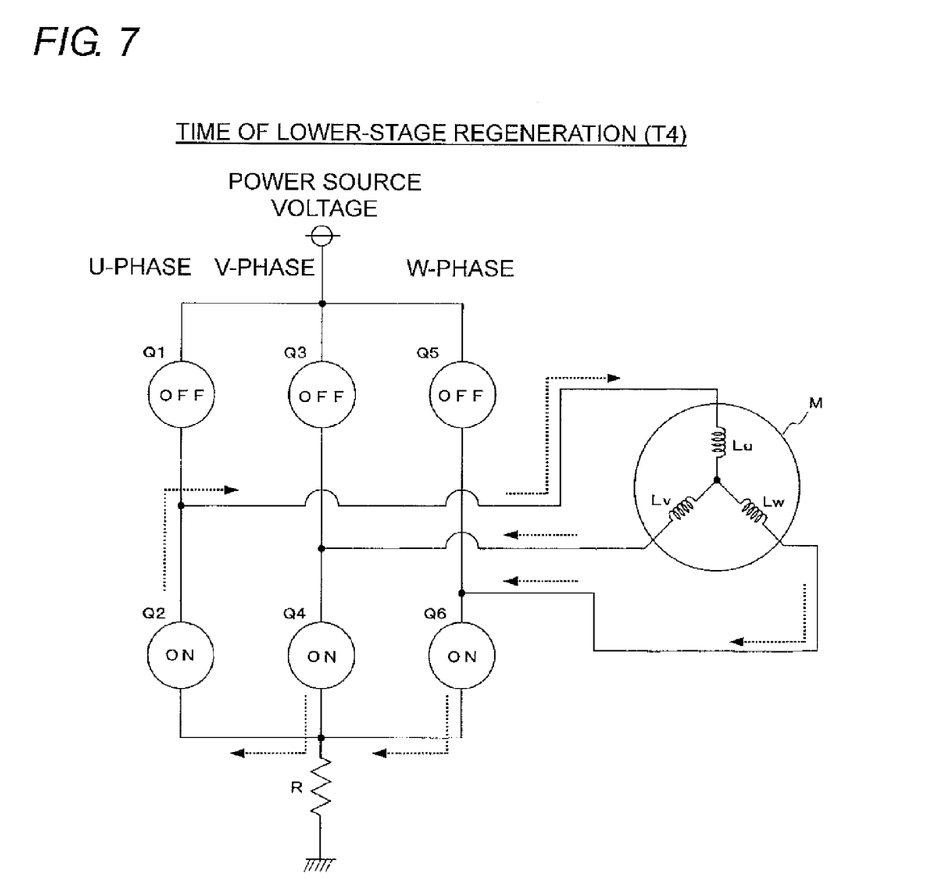
FIG. 7 is a diagram showing the current channel on timing T4 of FIG. 3.

On the timing T4 of FIG. 3, the upper-stage switching elements Q1, Q3, Q5 are all off and the lower-stage switching elements Q2, Q4, Q6 are all on, and in the inverter circuit 2, the current flows in channels indicated by dashed arrows in FIG. 7. The current at this time is a regeneration current due to release of electric energy stored in the windings Lu, Lv, Lw of the motor M, and circulates via the lower-stage switching elements Q2, Q4, Q6. Therefore, also on the timing T4, the current should theoretically not flow through the shunt resistor R, but the drift current may flow through the shunt resistor R similarly to the above. Also in this case, with a voltage generated at each end of the shunt resistor R, a drift current is detected based on this voltage.

Next, drift compensation performed by the arithmetic control part 4 will be described. The drift compensation is a process of detecting a drift current flowing through the shunt resistor R when the state of the inverter circuit 2 is a state where the motor current is regarded as zero, to correct a detected current value of the motor current based on a detected current value of the drift current.

FIGS. 8A to 8D are time charts explaining drift compensation. FIG. 8A shows an on/off state of a power source supplied from the power circuit 1 to the inverter circuit 2. FIG. 8B shows a waveform of the PWM signal outputted from the driver IC3 to the inverter circuit 2. It is to be noted that, although six kinds of PWM signals are outputted from the driver IC3 corresponding to the switching elements 01 to Q6, the waveform of one PWM signal out of those is schematically shown in FIG. 8B. FIG. 8C shows respective changes in drift current, current offset value and target offset value. FIG. 8D shows a temperature change of an ECU (Electric Control Unit) mounted with the motor control device.

When the temperature of the ECU changes as in FIG. 8D, the drift current also fluctuates as in FIG. 8C. The drift current shows a tendency to increase with rise in temperature and decrease with fall in temperature. This drift current is measured with respect to each cycle T, and based on the measured value, a target offset value is set with respect to each cycle T. While the target offset value is compared with the current offset value, the current offset value is corrected stepwise by a fixed quantity until reaching the target offset value. That is, the current offset value is corrected just by a previously set correction value K with respect to each cycle T, thereby to be gradually brought closer to the target offset value. In this case, the correction value K is added to the current offset value when the current offset value<the target offset value, and the correction value K is subtracted from the current offset value when the current offset value>the target offset value.

Figure 9:
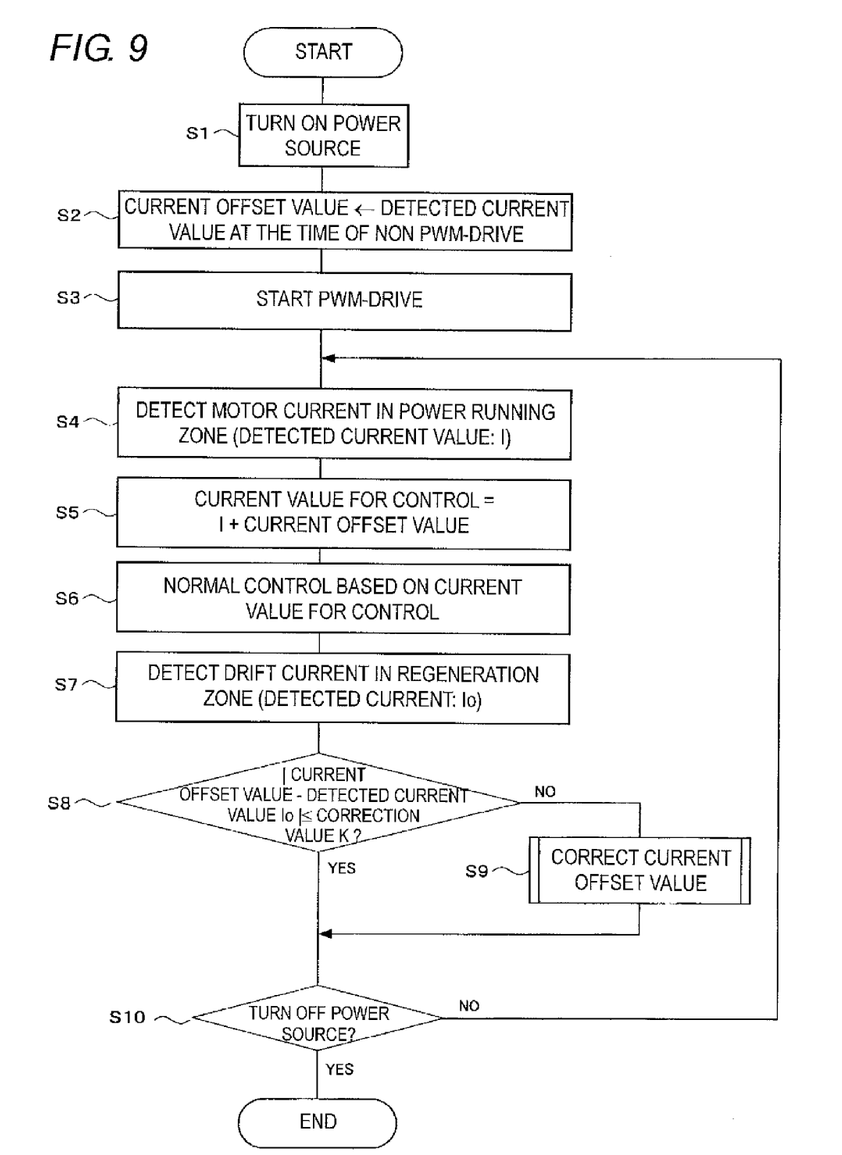
FIG. 9 is a flowchart showing a procedure for drift compensation.

Next, a procedure for drift compensation will be described in more detail with reference to a flowchart of FIG. 9. Each step in FIG. 9 is executed by a CPU constituting the arithmetic control part 4.

Figure 8:
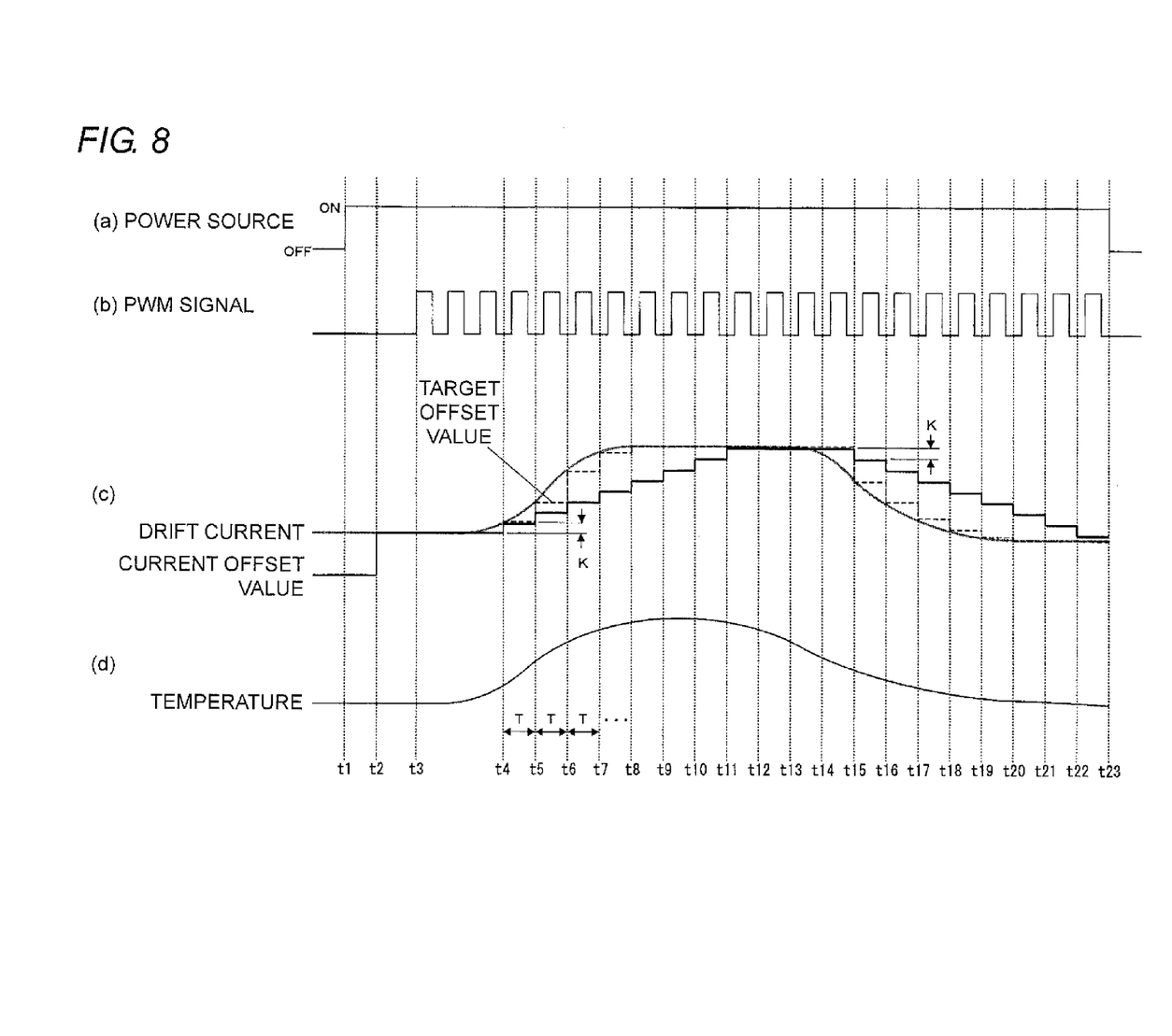
FIGS. 8A to 8D are time charts explaining drift compensation according to one or more embodiments of the present invention.

In Step S1, the power source to be supplied from the power circuit 1 to the inverter circuit 2 is turned on (time t1 of FIG. 8). At this time, the inverter circuit 2 is not driven since the driver IC3 has not come into an operating state, thus not outputting a PWM signal.

In Step S2, in a state where the inverter circuit 2 has not been PWM-driven (state where the motor current is regarded as zero), the drift current flowing through the shunt resistor R is detected via the amplifier circuit 5, and this detected current value is set as the current offset value (time t2 of FIG. 8). The set value at this time serves as an initial value of the current offset value.

In Step S3, the driver IC3 is operated to output the PWM signal, thereby to start PWM-driving of the inverter circuit 2 (time t3 of FIG. 8).

In Step S4, in the power running zone (cf. FIG. 3) in which the motor current flows, the motor current flowing through the shunt resistor R is detected. The detected current value at this time is referred to as I. The detected current value I is calculated by multiplying the detected current value as the output of the amplifier circuit 5 by a current gain.

In Step S5, the detected current value 1 detected in Step S4 is added with the current offset value, thereby to compensate the detected current value I of the motor current. This compensated current value serves as a current value for control. It should be noted that at the time of first-time execution of Step S5, the current offset value to be added is the initial value set in Step S2.

In Step S6, normal feedback control is performed based on the current value for control calculated in Step S5. That is, a voltage command value is calculated from a deviation between the current value for control and the target current value, and a PWM signal of each phase having a duty corresponding to this voltage command value is generated. The generated PWM signal is then outputted to the driver IC3, and the inverter circuit 2 is PWM-driven by the driver IC3. Thereby, the current flowing through the motor M is controlled so as to become the target current value.

In Step S7, the drift current flowing through the shunt resistor R is detected in the regeneration zone (cf. FIG. 3) in which the motor current is regarded as zero. The detected current value at this time is referred to as lo. The detected current value lo is calculated by multiplying the detected current value as the output of the amplifier circuit 5 by a current gain.

In Step S8, a difference between the current offset value used in Step S5 and the detected current value lo of the drift current detected in Step S7, and it is determined whether or not this difference is in a predetermined range. Herein, the difference (absolute value) therebetween is compared with the correction value K as a threshold, and when the difference is not larger than the correction value K (Step S8; YES), a change in drift current is small, leading to the determination that correction of the current offset value is unnecessary, and the process goes to Step S10. On the other hand, when the difference therebetween exceeds the correction value K (Step S8; NO), a change in drift current is large, leading to the determination that correction of the current offset value is necessary, and the process goes to Step S9.

Figure 10:
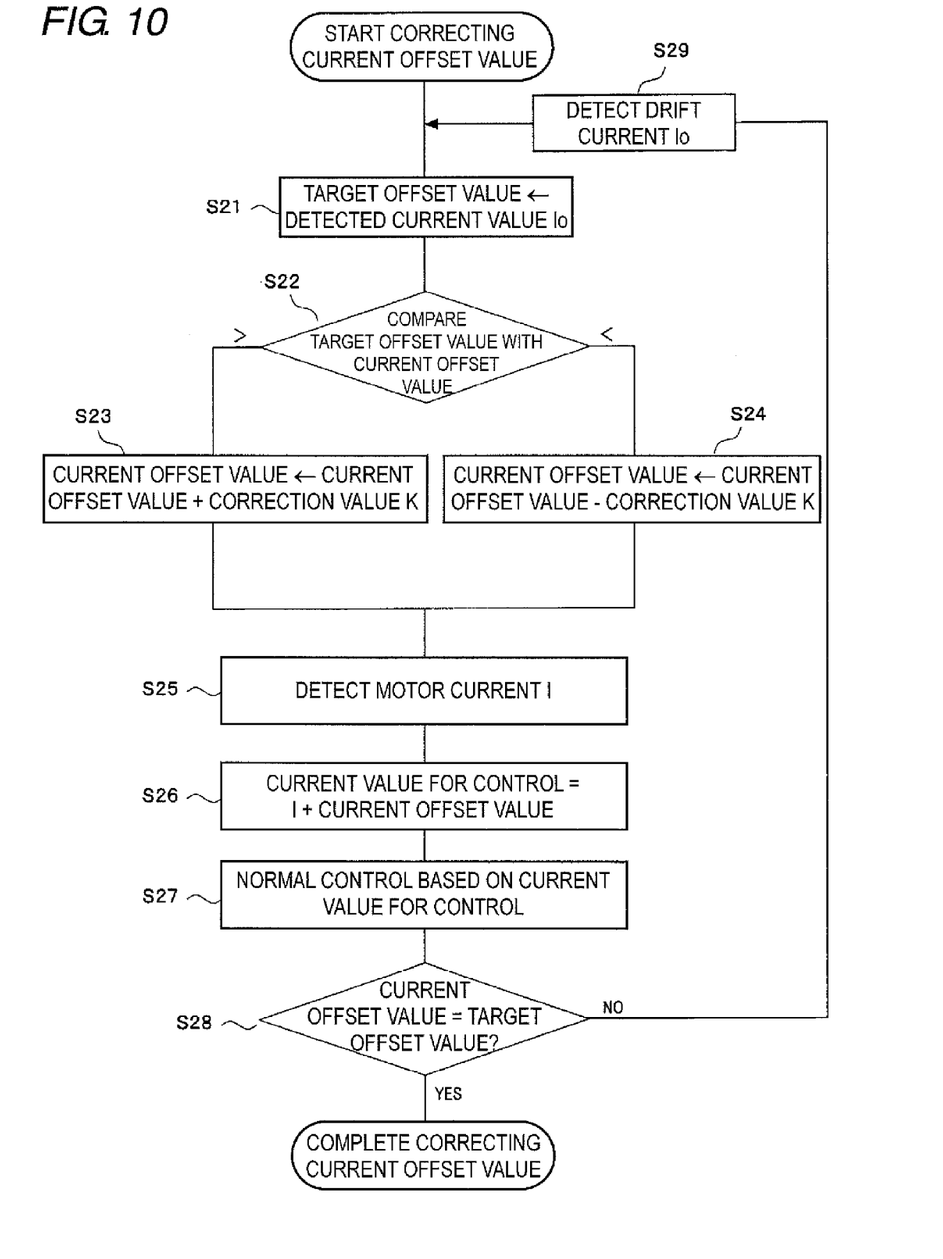
FIG. 10 is a flowchart showing a procedure for correction of a current offset value

FIG. 10 is a flowchart showing a detailed procedure for correction of the current offset value in Step S9 of FIG. 9. Each step in FIG. 10 is executed by the CPU constituting the arithmetic control part 4.

In Step S21, the detected current value lo of the drift current is set as a target offset value. At the time of first-time execution of Step S21, the detected current value lo is the current value detected in Step S7 of FIG. 9.

In Step S22, the target offset value set in Step S21 is compared with the current offset value. At the time of first-time execution of Step S22, the current offset value is the initial value set in Step S2 of FIG. 9.

As a result of the comparison in Step S22, when the current offset value is smaller than the target offset value, the process goes to Step S23 in order to increase the current offset value so as to bring the value closer to the target offset value. In Step S23, the correction value K is added to the current offset value to update the current offset value. Subsequently, the process goes to Step S25.

On the other hand, as a result of the comparison in Step S22, when the current offset value is larger than the target offset value, the process goes to Step S24 in order to decrease the current offset value so as to bring the value closer to the target offset value. In Step S24, the correction value K is subtracted from the current offset value, to update the current offset value. Subsequently, the process goes to Step S25.

In Step S25, similarly to Step S4 of FIG. 9, the motor current is detected in the power running zone.

In Step S26, the current value for control is updated. That is, the detected current value I of the motor current detected in Step S25 is added with the current offset value obtained in Steps S23, S24, to calculate a new current value for control.

In Step S27, normal feedback control is performed by means of the current value for control calculated in Step S26, as in Step S6 of FIG. 9.

In Step S28, it is determined whether or not the current offset value has reached the target offset value as a result of updating the current offset value in Steps S23, S24. When the current offset value has not reached the target offset value (Step S28; NO), continued correction of the current offset value is determined to be necessary, and the process goes to Step S29.

In Step S29, the drift current is detected in the regeneration zone in which the motor current is regarded as zero, as in Step S7 of FIG. 9. The process shifts to Step S21, and the detected current value lo of the drift current detected in Step S29 is set as a new target offset value. Thereby, the target offset value is updated.

Subsequently, in Step S22, the updated target offset value is compared with the existing current offset value, and based on a result of the comparison, the current offset value is corrected in Step S23 and 824. Then, each process of Steps S25 to S27 is executed, and the processes of Steps S21 to S29 are repeated until the current offset value becomes equal to the target offset value in Step S28.

By repeated execution of Steps S21 to S29, the current offset value is corrected by the correction value K with respect to each cycle T, and gradually gets closer to the target offset value. For example, in the zone of times t4 to t11 of FIG. 8, since the current offset value is smaller than the target offset value, the correction value K is added to the current offset value with respect to each cycle T, and the current offset value gets closer to the target offset value. Further, in each of the zones of times t15 to t23 of FIG. 8, since the current offset value is larger than the target offset value, the correction value K is subtracted from the current offset value with respect to each cycle T, and the current offset value gets closer to the target offset value.

When the current offset value becomes equal to the target offset value in Step S28 (Step S28; YES), it is determined that the current offset value has been corrected to a value required for the drift correction, and the correction of the current offset value is completed (times t11 to t15 of FIG. 8).

Thereafter, the process shifts to Step S10 of FIG. 9, and it is determined whether or not the power source to be supplied from the power circuit 1 to the inverter circuit 2 has been turned off. When the power source has not been turned off (Step S10; NO), the process goes to Step S4, and each of the following steps is executed. When the power source is turned off (Step S10; YES), a series of procedures of FIG. 9 is completed.

It is to be noted that in the example of FIG. 8, the drift current is monotonically increases and monotonically decreases in association with the temperature change, and addition of the correction value is repeated in the monotonic increase zone while subtraction of the correction value is repeated in the monotonic decrease section, thereby to correct the current offset value. However, the drift current fluctuates due to noise and the like other than the temperature. In the case of noise, although the change in drift current becomes irregular to cause mixed repetition of the addition and the subtraction, a theory of correction of the current offset value is the same as in the case of the temperature change.

As described above, in one or more embodiments of the present invention, the correction value K is added to or subtracted from the current offset value with respect to each cycle T in the drift compensation, so as to gradually get the current offset value closer to the target offset value while the current offset value is corrected little by little every time. For this reason, even when the drift current changes in a large scale, an abrupt change in current offset value is suppressed. Hence the abrupt change in number of revolutions of the motor in association with the abrupt change in voltage command value can be prevented, thereby to hold stable steering feeling.

Further, in one or more embodiments of the present invention, during the time until the current offset value reaches the target offset value, detection of the motor current (Step S25), compensation with respect to the detected current value by means of the current offset value (Step S26) and motor control based on the compensated detected current value (current value for control) (Step S27) are performed with respect to each cycle T. It is thus possible to perform detailed drift compensation in units of cycles.

Further, in one or more embodiments of the present invention, a difference between the current offset value and the detected current value of the drift current is obtained, and only when this difference is not in a predetermined range, the target offset value is set, to correct the current offset value (Steps S8, S21 to S24). For this reason, correction of the current offset value is executed when the difference between the current offset value and the detected current value of the drift current is large and it is not executed when the difference therebetween is small, thereby preventing the current value for control from fluctuating beyond necessity. It is thereby possible to hold further stable steering feeling.

Further, in one or more embodiments of the present invention, the detected current value of the drift current, detected during the time after turning-on of the power source of the inverter circuit 2 until start of operation of the inverter circuit 2, is set as an initial value of the current offset value (Step S2). After start of operation of the inverter circuit 2, the motor current is controlled based on the current value for control calculated by means of the initial value, to control the motor current (Steps S5, S6). Herein, since the initial value is the current offset value set with the motor M in a stopped state, the abrupt change in current offset value does not occur at the start of driving the motor M.

A variety of embodiments other than what were described above can be adopted within the scope of the present invention. For example, although the target offset value has been set with respect to each cycle and the current offset value has been corrected stepwise in the above embodiments, the target offset value may be set, for example, in every other cycle, to correct the current offset value stepwise.

Further, although the correction value K in Steps S23, S24 of FIG. 10 has been used as the threshold in Step S8 of FIG. 9 in the above embodiments, the threshold in Step S8 may be a different value from the correction value K.

Further, although the motor control device using a single shunt resistor R has been taken as an example in the above embodiments, one or more embodiments of the present invention is also applicable to a case where shunt resistors are provided with respect to the lower arms of the respective phases.

Further, although the current of the shunt resistor R has been detected and the drift compensation is performed in each of the upper-stage regeneration zone and the lower-stage regeneration zone in the above embodiments, the current of the shunt resistor R may be detected and the drift compensation is performed in either the upper-stage regeneration zone or the lower-stage regeneration zone Further, although the case of the U-phase being the maximum phase, the V-phase being the middle phase and the W-phase being the minimum phase has been taken as an example (FIG. 2) in the above embodiments, this is one example, and one or more embodiments of the present invention is, for example, applicable even in the case of any combination of the respective phases with the maximum phase, the middle phase and the minimum phase, such as the case of the U-phase being the minimum phase, the V-phase being the middle phase and the W-phase being the maximum phase or the case of the U-phase being the middle phase, the V-phase being the minimum phase and the W-phase being the maximum phase.

Further, although the FET has been used as each of the switching elements Q1 to Q6 in the above embodiments, another switching element such as an IGBT (Insulated Gate Bipolar Transistor) may be used as another switching element.

Further, although the three-phase motor has been taken as an example as the motor M in the above embodiments, one or more embodiments of the present invention is also applicable to the case of driving a multiple-phase motor having four or more phases.

Further, although the blushless motor has been taken as an example as the motor M in the above embodiments, one or more embodiments of the present invention is also applicable to a device for driving an induction motor, a synchronous motor, or the like.

Moreover, although the example of applying one or more embodiments of the present invention to the electric power steering device of a vehicle has been cited above, one or more embodiments of the present invention is also applicable to a device other than the electric power steering device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A motor control device, comprising:
a motor driving unit for driving that drives a motor;
a current detecting unit that detects a motor current flowing through the motor;
a control unit that compares a detected current value of the motor current detected by the current detecting unit with a target current value to obtain a deviation, to control the motor driving unit based on the deviation; and
a compensation unit that sets as a current offset value a detected current value of a drift current detected by the current detecting unit in a state where the motor current is regarded as zero, to compensate the detected current value of the motor current by the current offset value,
wherein the compensation unit sets a target offset value in accordance with the current value of the detected drift current to correct the current offset value stepwise, previously set correction value for each cycle, until the current offset value reaches the target offset value,
wherein the compensation unit sets as an initial value of the current offset value the detected current value of the drift current detected by the current detecting unit during the time after turning-on of a power source of the motor driving unit until start of operation of the motor driving unit, and
wherein the control unit controls the motor driving unit based on a deviation between the detected current value of the motor current, compensated by means of the initial value, and the target current value after start of operation of the motor driving unit.

2. The motor control device according to claim 1,
wherein the current detecting unit detects the drift current with respect to each of predetermined cycles,
wherein the compensation unit sets a target offset value with respect to each of the cycles based on a detected current value of the drift current detected by the current detecting unit, and
wherein the compensation unit adds a previously set correction value to the current offset value when the current offset value is smaller than the target offset value, and subtracts the correction value from the current offset value when the current offset value is larger than the target offset value, thereby to correct the current offset value with respect to each of the cycles.

3. The motor control device according to claim 2,
wherein the current detecting unit detects a motor current with respect to each of the cycles,
wherein the compensation unit compensates a detected current value of the motor current detected by the current detecting unit by means of the corrected current offset value with respect to each of the cycles, and
wherein the control unit controls the motor diving unit based on a deviation between the compensated detected current value of the motor current and the target current value with respect to each of the cycles.

4. The motor control device according to claim 1, wherein the compensation unit obtains a difference between the current offset value and the detected current value of the drift current, and sets the target offset value, to correct the current offset value only when this difference is not in a predetermined range.

* * * * *